(12) United States Patent
Clynne et al.

(10) Patent No.: US 11,019,244 B2
(45) Date of Patent: May 25, 2021

(54) EXTERNALLY VIEWABLE ORIENTATION INDICATION APPARATUS AND METHOD FOR AN OPTICAL SENSOR

(71) Applicant: UBICQUIA IQ LLC, Melbourne, FL (US)

(72) Inventors: Thomas Clynne, East Cleveland, OH (US); Anirudha Deshpande, East Cleveland, OH (US); Koushik Babi Saha, Strongsville, OH (US); Jonathan Meyer, East Cleveland, OH (US)

(73) Assignee: Ubicquia IQ LLC, Fort Lauderdale, FL (US)

( * ) Notice: Subject to any disclaimer, the term of this patent is extended or adjusted under 35 U.S.C. 154(b) by 358 days.

(21) Appl. No.: 15/459,169

(22) Filed: Mar. 15, 2017

(65) Prior Publication Data

US 2017/0331995 A1 Nov. 16, 2017

Related U.S. Application Data

(60) Provisional application No. 62/334,578, filed on May 11, 2016.

(51) Int. Cl.
*H04N 5/225* (2006.01)
*G03B 29/00* (2021.01)
(Continued)

(52) U.S. Cl.
CPC ............. *H04N 5/2259* (2013.01); *G03B 5/00* (2013.01); *G03B 17/18* (2013.01); *G03B 29/00* (2013.01);
(Continued)

(58) Field of Classification Search
CPC .......... G03B 7/00; G03B 17/18; G03B 29/00; H04N 5/2259; H04N 5/2252; H04N 5/2253
See application file for complete search history.

(56) References Cited

U.S. PATENT DOCUMENTS 3,760,700 A * 9/1973 Trankner ............... G03B 7/099
396/295
4,514,066 A * 4/1985 Starp ........................ G03B 9/58
396/298

(Continued)

FOREIGN PATENT DOCUMENTS

| CN | 1505850 A | 6/2004 |
|---|---|---|
| CN | 1940486 A | 4/2007 |

(Continued)

OTHER PUBLICATIONS

Search Report and Opinion issued in connection with corresponding ES Application No. P201730654 dated Oct. 31, 2017.
(Continued)

*Primary Examiner* — Jefferey F Harold
*Assistant Examiner* — Timothy R Newlin

(57) ABSTRACT

A sensor system comprising a housing, a movement apparatus to change an orientation of a directional sensor disposed inside the housing, and an indicator apparatus to present the orientation of the directional sensor to a viewer that is outside of the housing. The directional sensor may be a camera, and the indicator apparatus may indicate a field of view of the camera to the viewer that is outside of the housing.

14 Claims, 11 Drawing Sheets

(51) Int. Cl.
*G03B 5/00* (2021.01)
*G03B 17/18* (2021.01)

(52) U.S. Cl.
CPC ......... *H04N 5/2252* (2013.01); *H04N 5/2253* (2013.01)

(56) References Cited

U.S. PATENT DOCUMENTS

| | | | | |
|---|---|---|---|---|
| 5,825,432 | A * | 10/1998 | Yonezawa | G08B 13/19641 348/563 |
| 6,019,524 | A * | 2/2000 | Arbuckle | F16M 11/10 248/346.06 |
| 6,088,737 | A * | 7/2000 | Yano | G06F 9/505 709/224 |
| 6,301,982 | B1 * | 10/2001 | Kubo | G01C 19/00 74/5.22 |
| 6,466,260 | B1 * | 10/2002 | Hatae | G08G 1/0175 348/149 |
| 6,567,121 | B1 * | 5/2003 | Kuno | H04N 5/232 348/211.3 |
| 6,927,905 | B1 * | 8/2005 | Kashitani | H04N 5/2259 348/211.99 |
| 7,997,546 | B1 * | 8/2011 | Andersen | F16B 2/08 248/214 |
| 8,970,703 | B1 * | 3/2015 | Thomas, II | H04N 5/76 348/159 |
| 2002/0126059 | A1 * | 9/2002 | Zimmerman | H01Q 1/246 343/757 |
| 2003/0174865 | A1 * | 9/2003 | Vernon | G06K 9/2018 382/105 |
| 2006/0232664 | A1 * | 10/2006 | Toly | G09B 23/285 348/45 |
| 2007/0064104 | A1 * | 3/2007 | Ikeda | G08B 13/19689 348/143 |
| 2008/0277473 | A1 * | 11/2008 | Kotlarsky | G06K 7/10722 235/462.07 |
| 2009/0110380 | A1 | 4/2009 | Fantone et al. | |
| 2011/0216193 | A1 * | 9/2011 | Shim | G03B 15/00 348/143 |
| 2013/0021214 | A1 * | 1/2013 | Zimmerman | H01Q 3/08 343/761 |
| 2013/0278774 | A1 * | 10/2013 | Fujimatsu | G08B 13/19645 348/159 |
| 2014/0015981 | A1 * | 1/2014 | Dietl | H04N 7/18 348/159 |
| 2016/0088230 | A1 * | 3/2016 | Flores | H04N 5/23203 348/211.4 |
| 2016/0094764 | A1 * | 3/2016 | Martin | G01P 15/00 348/208.2 |

FOREIGN PATENT DOCUMENTS

| | | |
|---|---|---|
| CN | 102095055 A | 6/2011 |
| CN | 203520026 | 4/2014 |
| CN | 104118367 A | 10/2014 |
| CN | 204465701 U | 7/2015 |
| EP | 1 770 713 A2 | 4/2007 |
| WO | 2004/058542 A1 | 7/2004 |

OTHER PUBLICATIONS

Office Action issued in connection with corresponding ES Application No. P201730654 dated Jun. 7, 2018, 3pgs.
Office Action issued in connection with corresponding ES Application No. P201730654 dated Nov. 13, 2018, 4pgs.

* cited by examiner

EXTERNALLY VIEWABLE ORIENTATION INDICATION APPARATUS AND METHOD FOR AN OPTICAL SENSOR

BACKGROUND

With an increasing emphasis on the development of smart city infrastructures, greater emphasis will be placed on the devices that can enable greater efficiencies, such as outdoor sensor devices. Sensor devices that can detect the flow and position of traffic and/or pedestrians have the potential to increase energy efficiency, since the detection and elimination of traffic jams, for example, can help reduce the use of transportation fuels. Numerous other advantages are possible in the development of smart city infrastructures. There continues to be a need for the implementation and deployment of sensor devices that are easy to maintain in the field.

During installations of optical sensors (such as cameras) onto outdoor lighting fixtures, the sensors may be located within an external housing in order to reliably and robustly facilitate handling, cosmetic, and environmental issues. Doing this, however, makes the adjustment of accurately orienting the sensors difficult once the system that includes the housing and sensor is installed.

For example, because a camera may be sealed within the housing in order to protect and/or hide the camera, correcting or changing the orientation of the camera (where the orientation can define the field of view of the camera) can require considerable time and effort as the housing may need to be repeatedly opened to adjust and potentially re-adjust the orientation of the camera. Orienting cameras during commissioning of camera systems can take up to an hour per system of manual labor, which represents a significant cost. This length of time is due to having to open and partially disassemble the housing after the system is installed on a fixture.

BRIEF DESCRIPTION OF THE DRAWINGS

The subject matter described herein will be better understood from reading the following description of non-limiting embodiments, with reference to the attached drawings, wherein below.

DETAILED DESCRIPTION

The inventive subject matter described herein provides an apparatus and method to adjust orientations of fixture mounted optical sensors (such as cameras) with both an environmentally sealed adjustment as well as a visual indicator that indicates the orientations of the sensors. The sensor may be disposed inside a housing to protect the sensor from environmental conditions, tampering, vandalism, theft, etc., but still be moveable relative to and within the housing to change the orientation (e.g., field of view of the sensor) from outside of the housing and provide a visual indication that represents the orientation of the sensor and that is visible from outside of the housing. In one example, this visual indication may be visible to an average human without assistance from one or more other devices (e.g., without assistance from magnifying devices, x-ray systems, etc.).

Figure 1:
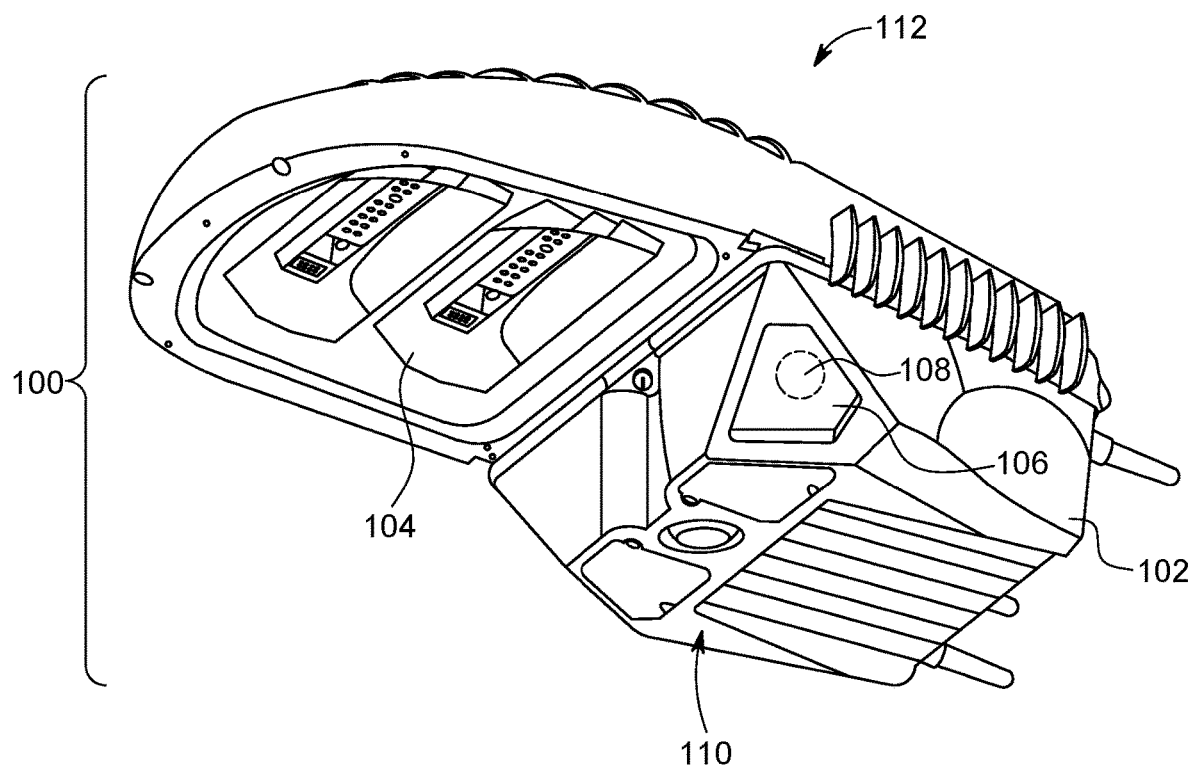
FIG. 1 illustrates a sensor system according to one embodiment of the inventive subject matter.

FIG. 1 illustrates a sensor system 100 according to one embodiment of the inventive subject matter. The sensor system 100 may be a luminaire that is mounted to another object (e.g., a pole, wall, etc.). The sensor system 100 includes an exterior housing 102, which may comprise a thermoplastic material. The housing 102 has a bottom side 110 and an opposite upper side 112. One or more light emitting apparatuses 104 are disposed in or connected to the housing 102. The light emitting apparatuses 104 may include light emitting diodes (LEDs) or other light sources, reflectors, and lenses, etc. The housing 102 includes one or more windows 106 that provide visibility into the interior of the housing 102 from outside of the housing 102 and that provide visibility outside of the housing 102 from inside the housing 102. The windows 106 may be made of glass, Plexiglas™, or other light-transmissive material which is transparent or transmissive to a wavelength of interest. The housing 102 may be sealed to prevent ingress of moisture, dirt, or other environmental conditions into the interior of the housing 102. The light emitting apparatuses 104 and the windows 106 are disposed on or near the bottom side 110 of the housing 102.

One or more optical sensors 108 are disposed inside the housing 102. The optical sensors 108 may represent cameras that obtain optic data, such as images and/or videos. The sensors 108 can be disposed inside the housing 102 and positioned within the housing 102 such that a field of view of the sensors 108 includes space outside of the housing 102. The field of view of a sensor 108 can include the area that is captured or represented in the optic data generated by the sensor 108. The sensors 108 may be located inside the housing 102 such that the sensors 108 are not accessible from outside of the housing 102. For example, the sensors 108 may not be touched or otherwise reached without opening the housing 102, breaking the housing 102, or otherwise interrupting the seal provided by the housing 102. As shown in FIG. 1, the sensors 108 may be visible from outside of the housing 102 via the windows 106.

Figure 2:
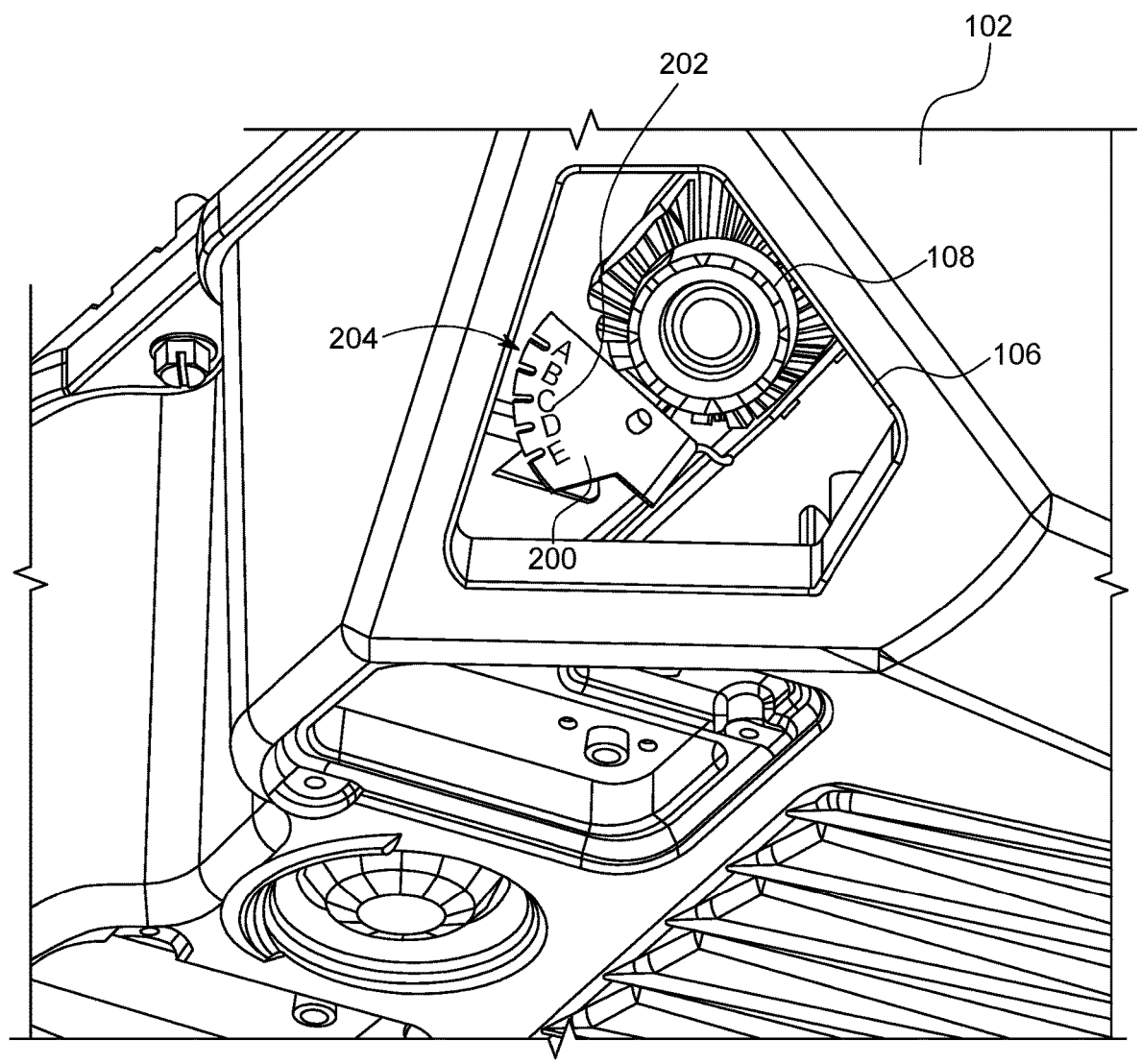
FIG. 2 illustrates a first view of a directional sensor shown in FIG. 1 and a window of the sensor system shown in FIG. 1 according to one embodiment.
Figure 3:
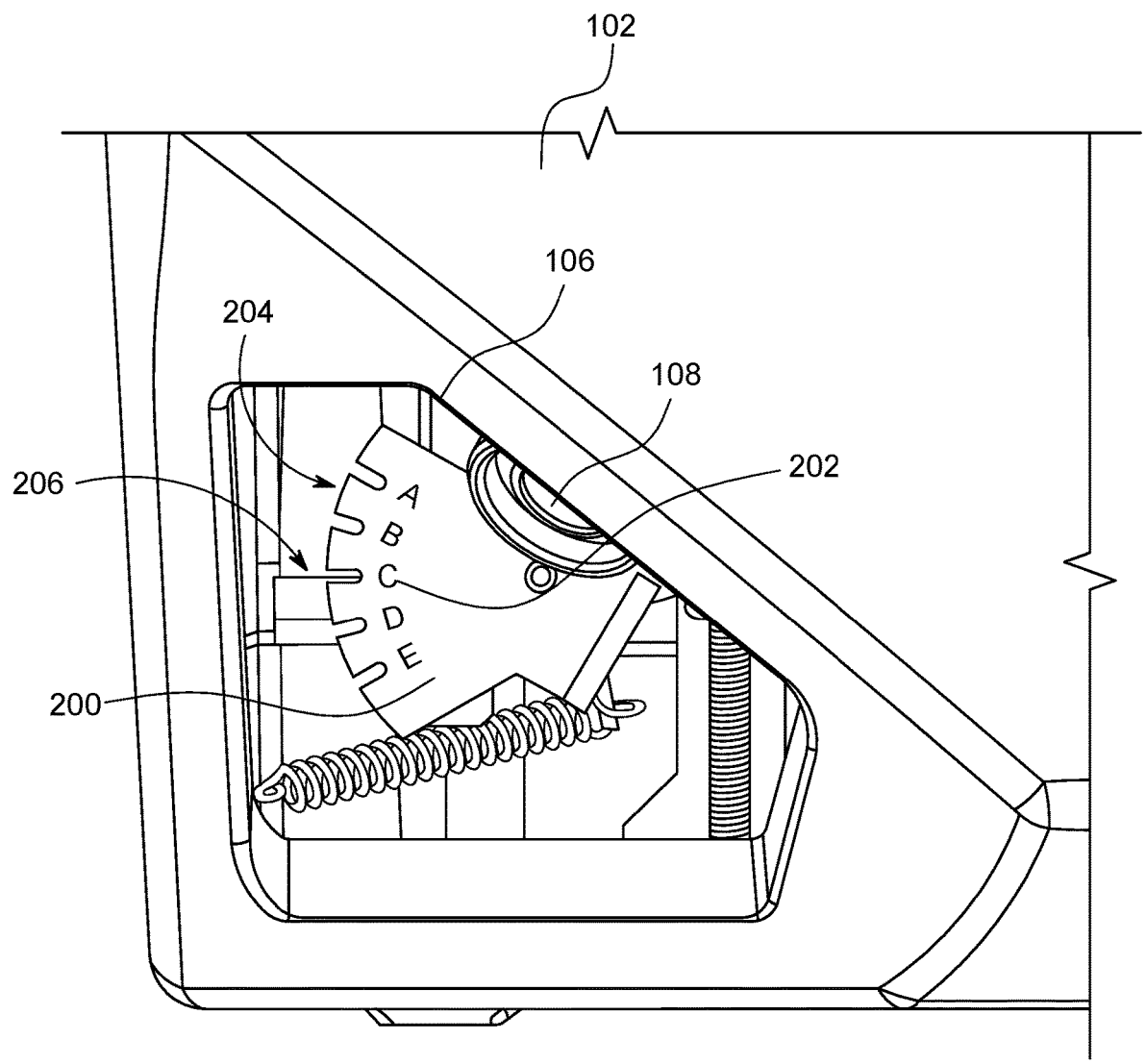
FIG. 3 illustrates a second view of the directional sensor shown in FIG. 2 and the window of the sensor system shown in FIG. 2 according to one embodiment.

FIGS. 2 and 3 illustrate views of one of the sensors 108 and one of the windows 106 of the system 100 shown in FIG. 1 according to one embodiment. An externally viewable sensor orientation indicator apparatus 200 is visible through the window 106. The orientation indicator apparatus 200 is a device or body that represents the orientation of the sensor 108, such as by indicating the field of view of the camera disposed inside the housing 102 and obtaining images and/or videos through the window 106. The orientation indicator apparatus 200 is shown in FIGS. 2 and 3 as a solid body having several indicia 202 written, printed, or engraved thereon. For example, the indicia 202 of letters A through E are shown along an outer edge 204 of the indicator apparatus 200. As described below, the orientation indicator apparatus 200 may move as the orientation of the sensor 108 is changed. The movement of the orientation indicator apparatus 200 is correlated with movement of the sensor 108 within the housing 102 such that, as the orientation of the sensor 108 changes, so too does the position of the orientation indicator apparatus 200 in the housing 102 and in the window 106.

As shown in FIG. 3, different orientations of the sensor 108 may cause different indicia 202 on the orientation indicator apparatus 200 to line up with or otherwise be next to an indication plate 206. Alternatively, different orientations of the sensor 108 may cause different indicia 202 on the orientation indicator apparatus 200 to line up with or otherwise be next to a marking or other indicia. The indicia 202 that is lined up with, next to, or otherwise closer to the indication plate 206 represents the orientation of the sensor 108 in the housing 102. As different indicia 202 are lined up with the indication plate 206, different orientations of the sensor 108 are indicated. For example, in FIG. 3, the C indicia 202 is lined up with or closer to an upper edge of the indication plate 206, thereby representing that the sensor 108 is positioned in the housing 102 to have an orientation and field of view associated with the C indicia 202. If the sensor 108 were moved within the housing 102 to a different orientation to have a different field of view, the orientation indicator apparatus 200 may have another indicium 202 lined up with the indication plate 206, such as the A, B, D, or E indicia 202, thereby indicating to a viewer outside of the housing 102 that the sensor 108 has another, different orientation and field of view.

While the orientation indicator apparatus 200 is illustrated as a solid body that moves to indicate the different orientations of the sensor 108, optionally, the apparatus 200 may indicate the orientations in another manner. For example, the apparatus 200 may be a sensor that detects movement or the orientation of the sensor 108 and visually display the orientation of the sensor 108 on an electronic display or light. While the apparatus 200 includes letters as the indicia 202, alternatively, the apparatus 200 can include other indicia to indicate the orientation. For example, numbers, degrees, radians, etc. can be used as the indicia 202.

Figure 4:
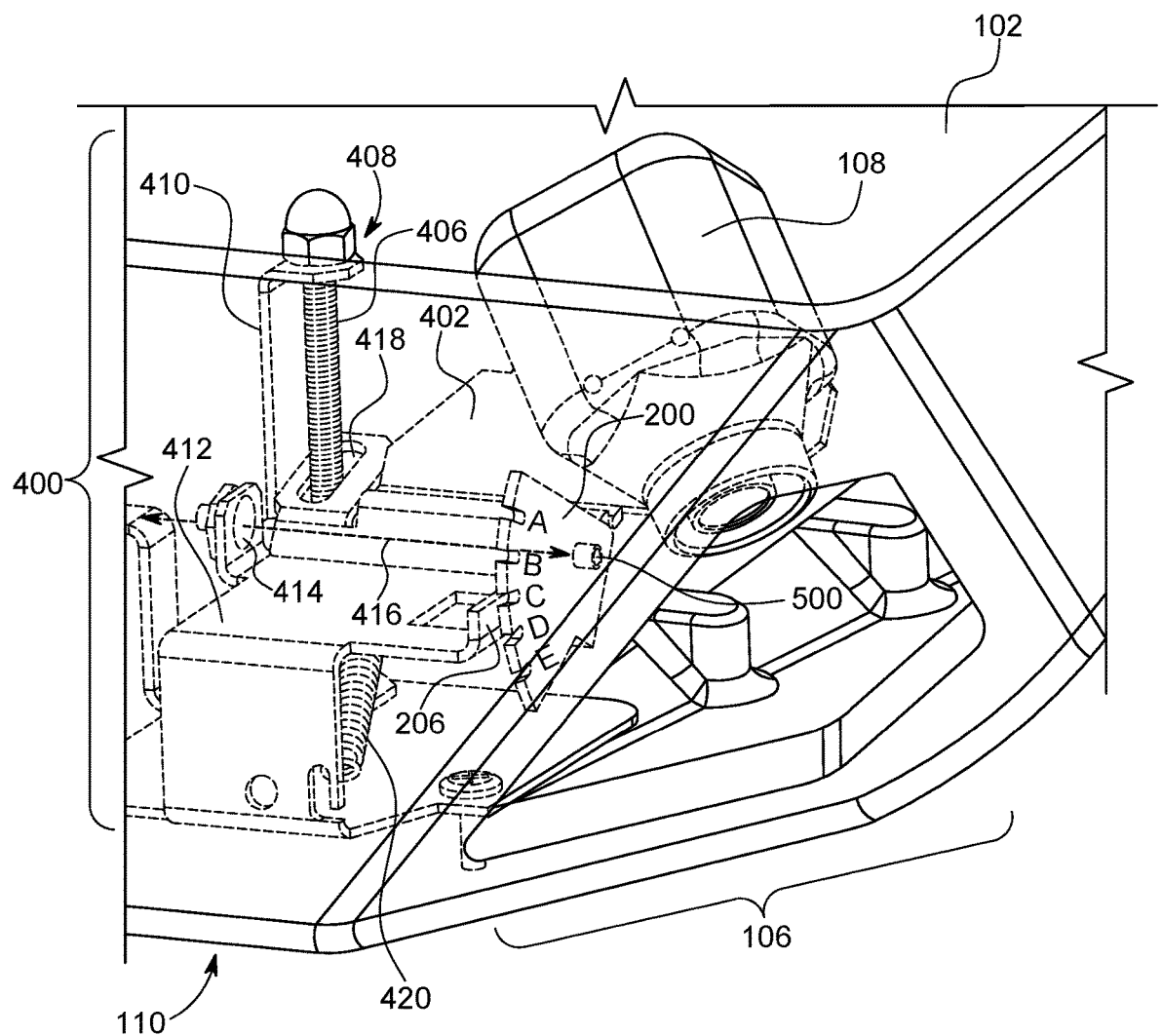
FIG. 4 illustrates a sensor movement apparatus according to one embodiment of the inventive subject matter described herein.
Figure 5:
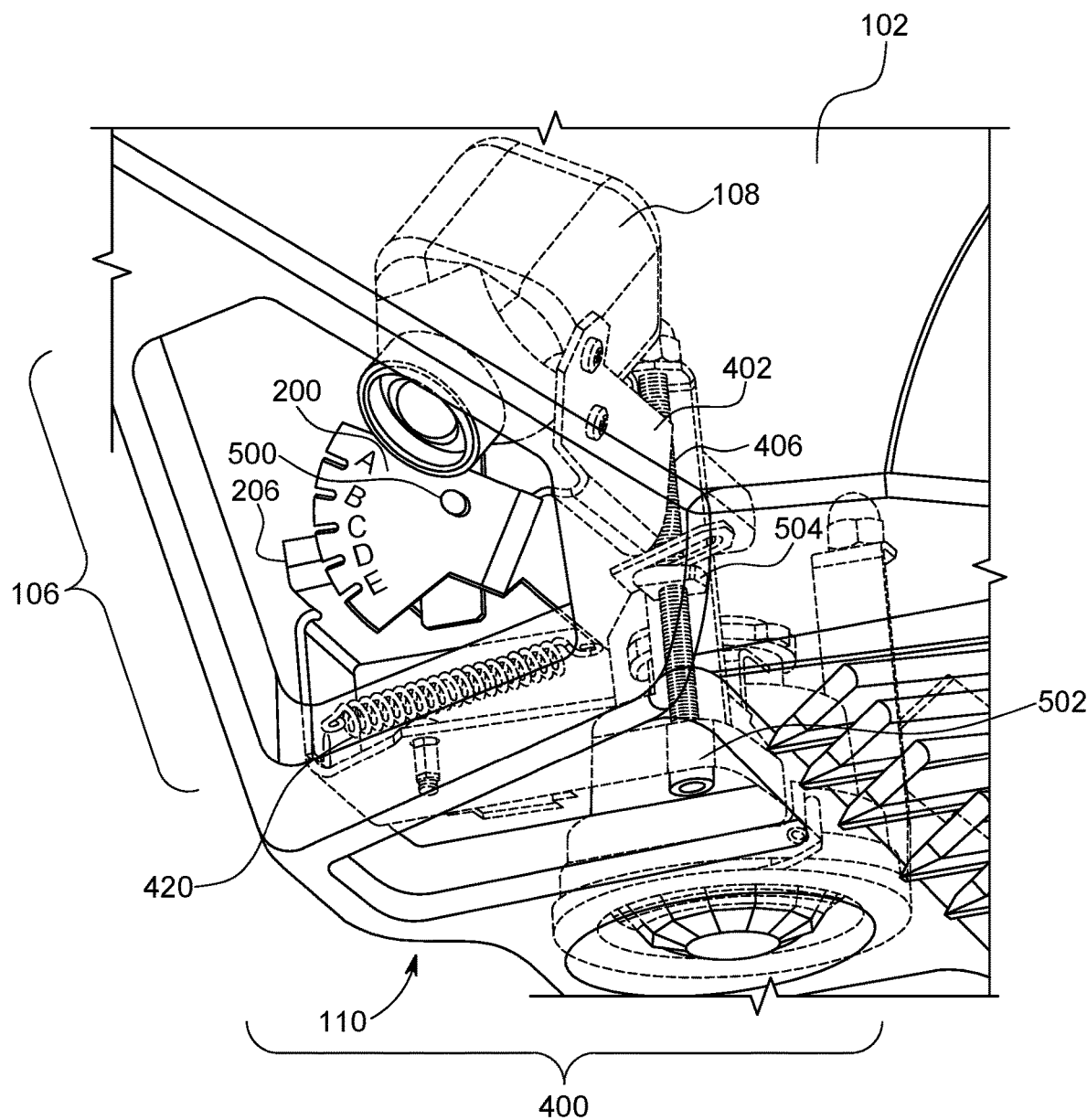
FIG. 5 also illustrates the sensor movement apparatus shown in FIG. 4 according to one embodiment of the inventive subject matter described herein.

FIGS. 4 and 5 illustrate a sensor movement apparatus 400 according to one embodiment of the inventive subject matter described herein. The movement apparatus 400 is used to change the orientation of the sensor 108 inside the housing 102 from a location that is outside of the housing 102. For example, the movement apparatus 400 can be actuated from exterior to the housing 102 in order to move the sensor 108 within the housing 102 and change the orientation of the sensor 108. This permits an operator of the system 100 to change the field of view of a camera inside the housing 102 without having to open the housing 102.

The movement apparatus 400 includes a pivot plate 402 to which the sensor 108 is coupled. As shown in FIG. 5, the sensor 108 may be fastened to the plate 402 by fasteners 500, such as rivets, screws, etc. As shown in FIG. 4, the indicator apparatus 200 also is coupled with the plate 402, such as by one or more fasteners 500. The coupling of the sensor 108 to the plate 402 causes the sensor 108 and the indicator apparatus 200 to move as the plate 402 is moved. The plate 402 is pivotally connected with an angled bracket 412 by a fastener 414, such as a rivet, screw, etc. The angled bracket 412 includes the indication plate 206 in the illustrated embodiment. Alternatively, the indication plate 206 may be separate from the angled bracket 412. As described below, the plate 402 pivots within the housing 102 relative to the bracket 412 about or around a pivot axis 416 (shown in FIG. 4).

A tilt adjustment screw 406 is elongated from a top end 408 to an opposite bottom end 502 (shown in FIG. 5). The top end 408 of the adjustment screw 406 is connected with an upwardly extending adjustment arm 410 inside the housing 102. This adjustment arm 410 is fixed in position in the housing 102 to prevent rotation of the adjustment screw 406 (as described below) from causing the adjustment screw 406 to move up or down relative to the adjustment arm 410 (e.g., to prevent the adjustment screw 406 from backing out of the adjustment arm 410).

The bottom end 502 of the adjustment screw 406 extends through an opening in the housing 102 such that the bottom end 502 is accessible outside of the housing 102. An operator may use a tool, such as an Allen wrench or hex key, screw driver, or other tool, to rotate the adjustment screw 406 from outside of the housing 102. The coupling of the adjustment screw 406 to the adjustment arm 410 prevents the rotation of the adjustment screw 406 from moving into or out of the housing 102.

The adjustment screw 406 extends through an opening 418 in the plate 402. Alternatively, the adjustment screw 406 may be coupled with the plate 402, such as by passing through a threaded opening in the plate 402 that engages the screw 406. A tilt adjustment nut 504 (shown in FIG. 5) is coupled with the adjustment screw 406 in the illustrated embodiment. The nut 504 may be beneath the plate 402 in FIG. 5 such that rotation of the adjustment screw 406 causes the nut 504 to travel up or down the adjustment screw 406 (depending on the direction of rotation).

For example, an operator can rotate the bottom end 502 of the adjustment screw 406 in a clockwise direction to cause the adjustment nut 504 to move downward in the perspectives of FIGS. 4 and 5. This can result in the plate 402 pivoting about or around the axis 416 in a direction toward the bottom side 110 of the housing 102. As the plate 402 pivots in this downward direction, the orientation of the sensor 108 and the location of the indication apparatus 200 changes. The changing orientation of the sensor 108 causes the field of view of the sensor 108 to change and causes the position of the indication apparatus 200 to change relative to the indication plate 206.

As another example, the operator can rotate the bottom end 502 of the adjustment screw 406 in a counter-clockwise direction to cause the adjustment nut 504 to move upward in the perspectives of FIGS. 4 and 5. This can result in the nut 504 moving the plate 402 to cause the plate 402 to pivot about or around the axis 416 in a direction toward the upper side 112 of the housing 102. As the plate 402 pivots in this upward direction, the orientation of the sensor 108 and the location of the indication apparatus 200 changes. The changing orientation of the sensor 108 causes the field of view of the sensor 108 to change and causes the position of the indication apparatus 200 to change relative to the indication plate 206. The changing position of the indication apparatus 200 relative to the indication plate 206 can provide a visual indication or notification to a viewer outside of the housing 102 as to the orientation of the sensor 108, as described above.

In one embodiment, a pressure spring 420 is coupled with the angled bracket 412 and the pivot plate 402. This spring 420 extends from the angled bracket 412 to the pivot plate 402 to provide an opposing force against the adjustment nut 504. The spring 420 generates the force to press the pivot plate 402 against the nut 504 such that movement of the nut 504 in the opposite directions along the length of the adjustment screw 406 results in movement of the pivot plate 402, as described above. The spring 420 can remove backlash in the apparatus 400 and maintain force on the apparatus 400 to ensure that the sensor 108 remains aligned or in the same orientation until the adjustment screw 406 is actuated.

Figure 6:
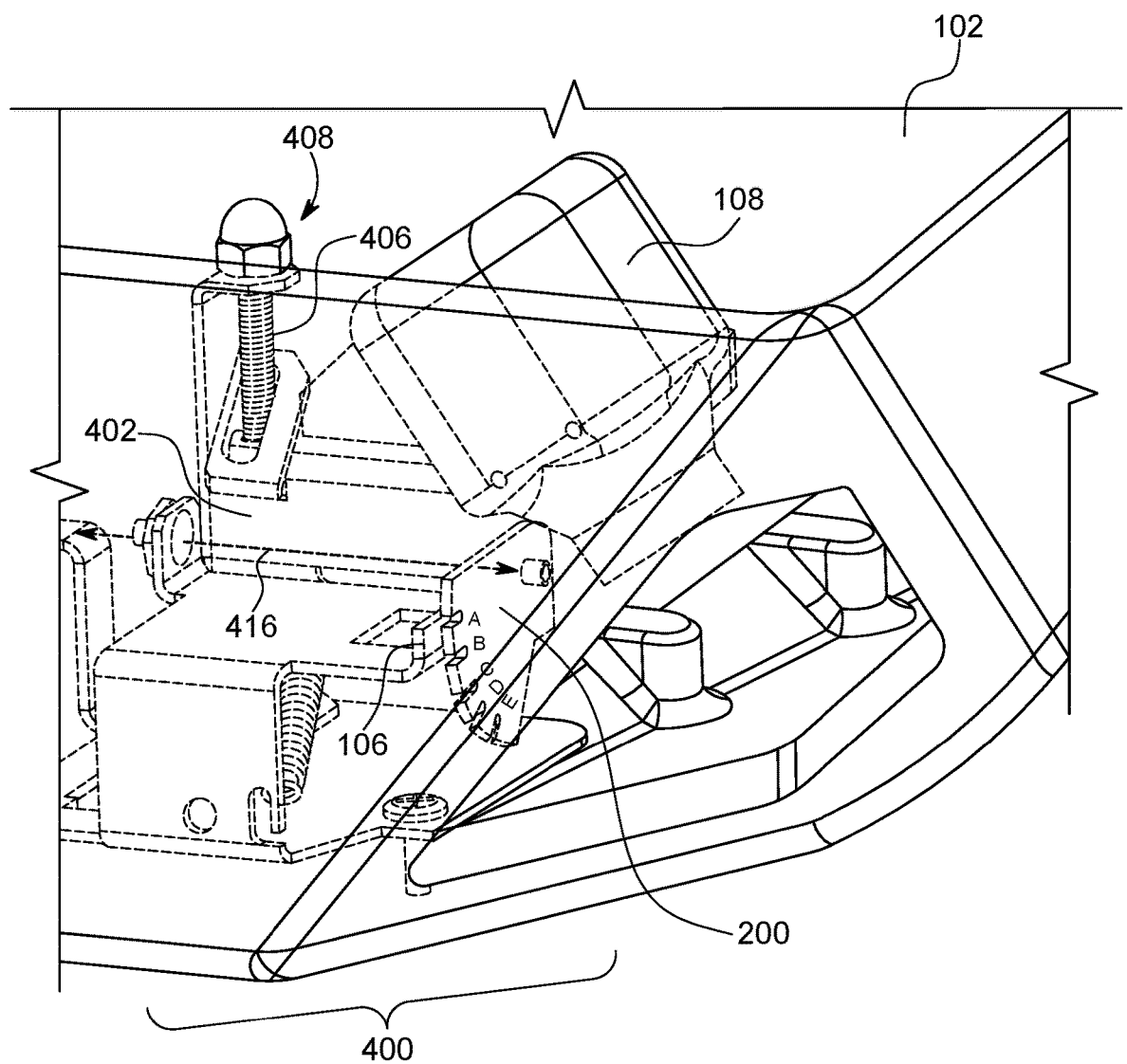
FIG. 6 illustrates the sensor movement apparatus shown in FIG. 4 in a first state or position according to one example.
Figure 7:
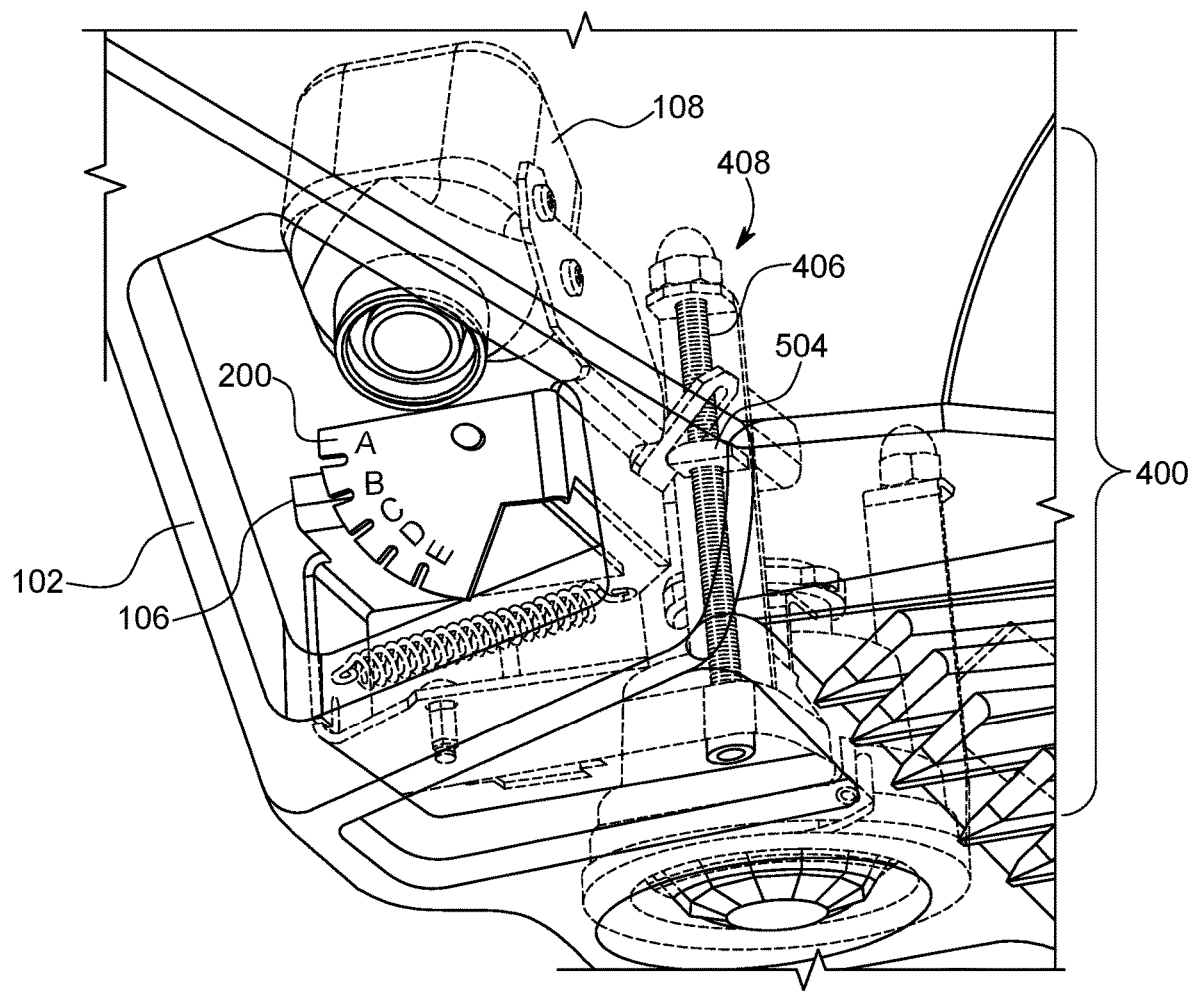
FIG. 7 illustrates the sensor movement apparatus shown in FIG. 4 in the first state or position according to one example.
Figure 8:
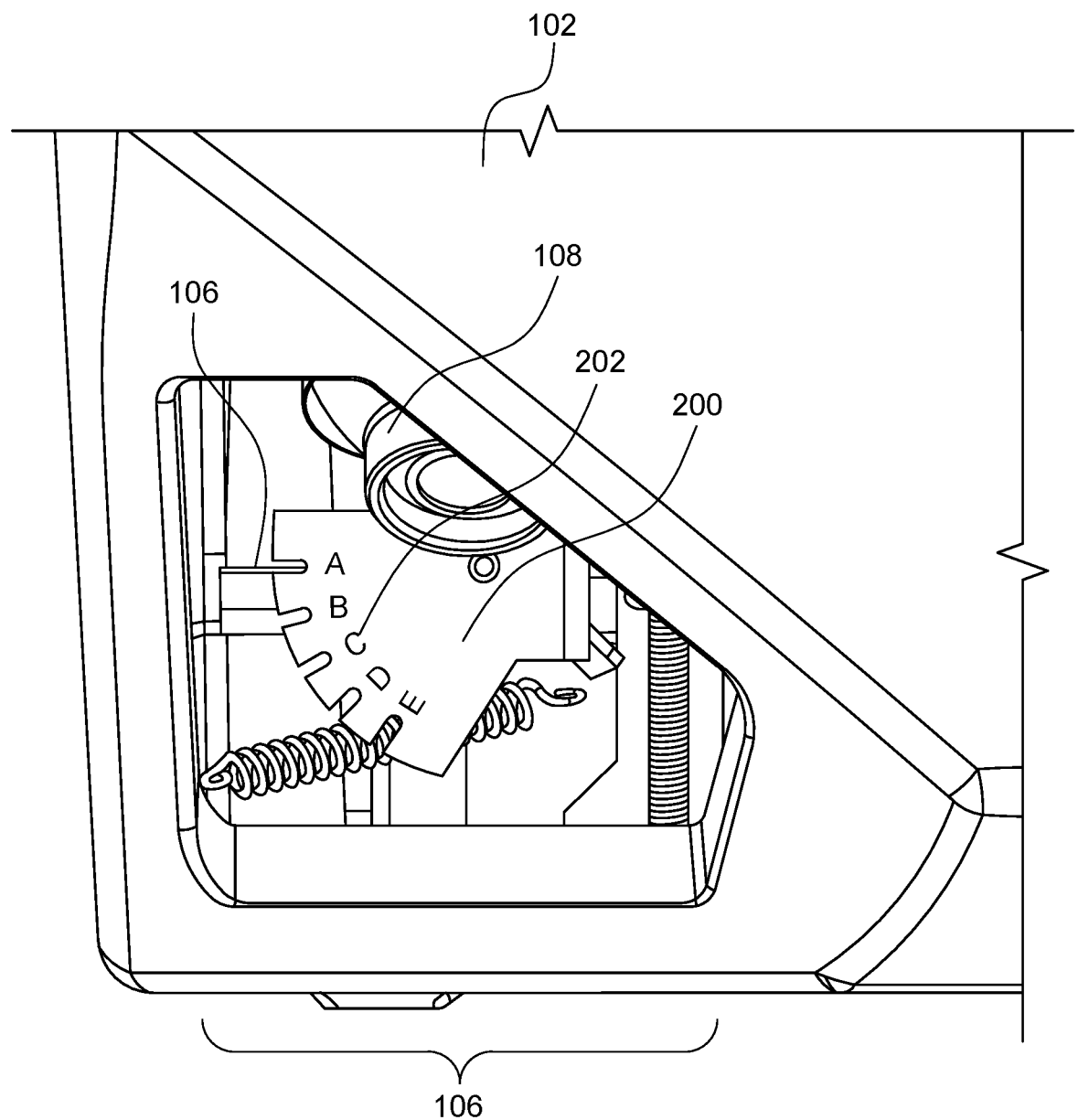
FIG. 8 illustrates the sensor movement apparatus shown in FIG. 4 in the first state or position according to one example.

FIGS. 6 through 8 illustrate the sensor movement apparatus 400 in one state according to one example. In the example shown in FIGS. 6 through 8, the adjustment screw 406 has been actuated to cause the adjustment nut 504 to move upward along the adjustment screw 406 toward the top end 408 of the adjustment screw 406. As a result, the pivot plate 402 has rotated about the pivot axis 416 in a counter-clockwise direction to tilt the rear side of the sensor 108 upward within the housing 102 toward the upper side 112 of the housing 102. In this orientation, the sensor 108 is directed downward such that the field of view of the sensor 108 is directed downward beneath the housing 102. This pivoting also causes the position of the orientation indication apparatus 200 to change relative to the indicator plate 206.

In the example shown in FIGS. 2 through 5, the C indicia 202 on the orientation indication apparatus 200 was aligned with the upper edge of the indicator plate 206. Rotation of the adjustment screw 406 in the counter-clockwise direction, however, causes the adjustment nut 504 to move upward along the adjustment screw 406 and cause the plate 402 to pivot upward. This pivoting motion of the plate 402 causes the indicator apparatus 200 to pivot downward relative to the indicator plate 206 and, as a result, move the A and B indicia 202 closer to or aligned with the indicator plate 206 and the C, D, and E indicia 202 to move farther from and below the indicator plate 206. As shown in FIG. 8, an operator outside of the housing 102 is able to view the new orientation of the sensor 108 as the "A" indicia 202 is now aligned with the indicator plate 206. Each of the indicia 202 has a notch or slot in the indication apparatus 200. When a fixed location marker (such as the top edge of the indicator plate 206) is within this notch or slot, the corresponding indicia 202 indicates the orientation of the sensor 108.

Figure 9:
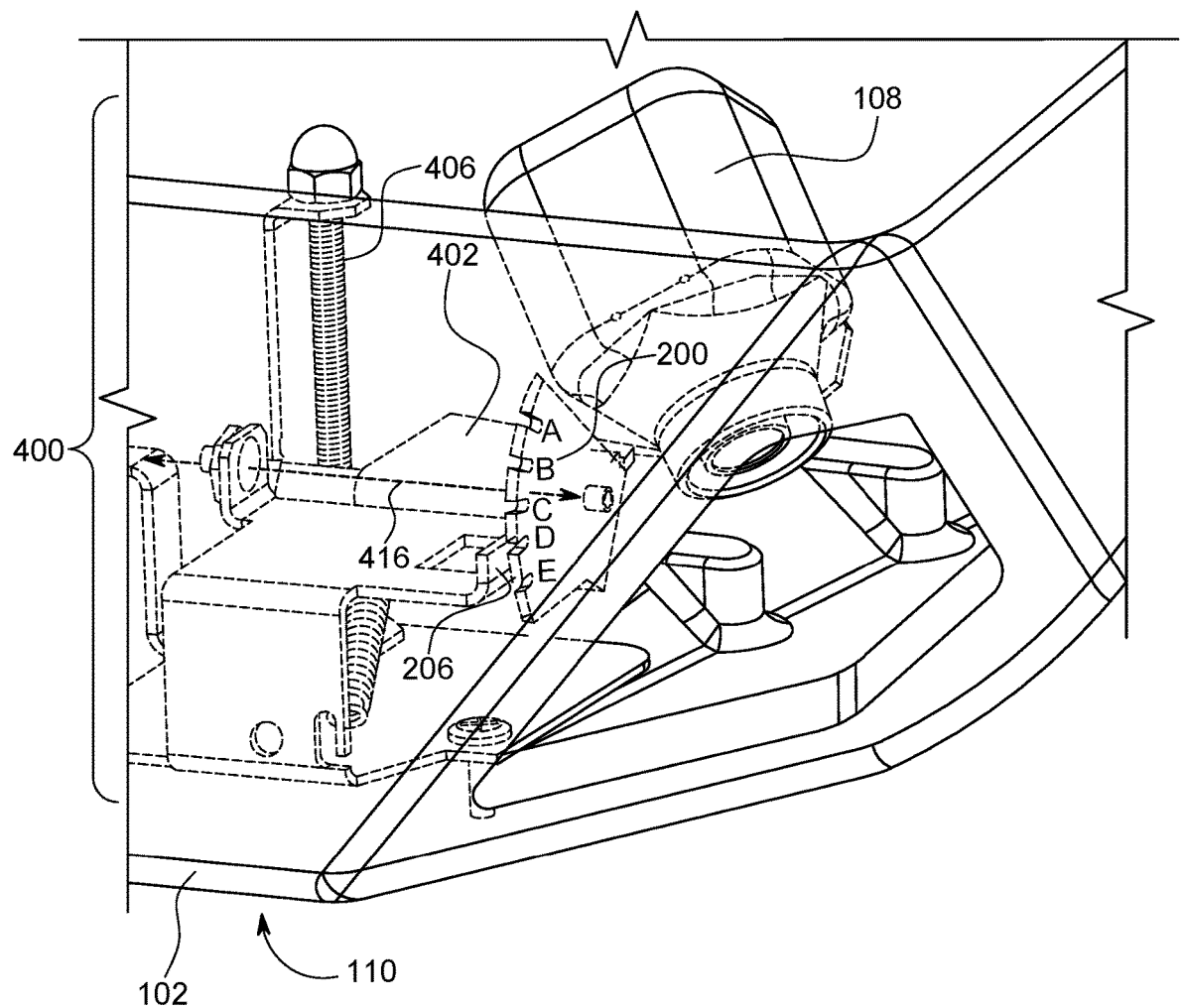
FIG. 9 illustrates the sensor movement apparatus shown in FIG. 4 in a different, second state or position according to one example.
Figure 10:
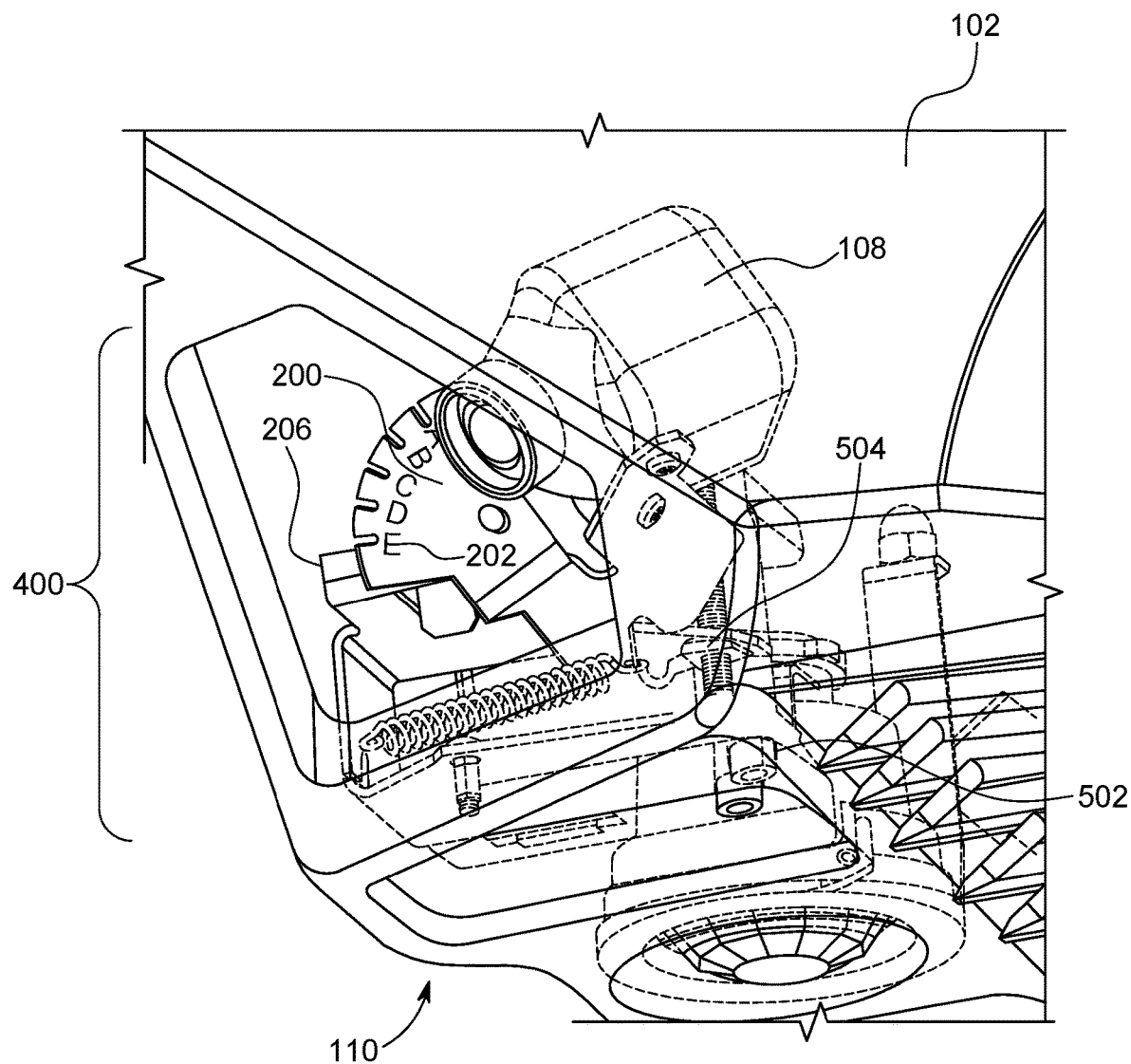
FIG. 10 illustrates the sensor movement apparatus shown in FIG. 4 in the second state or position according to one example.
Figure 11:
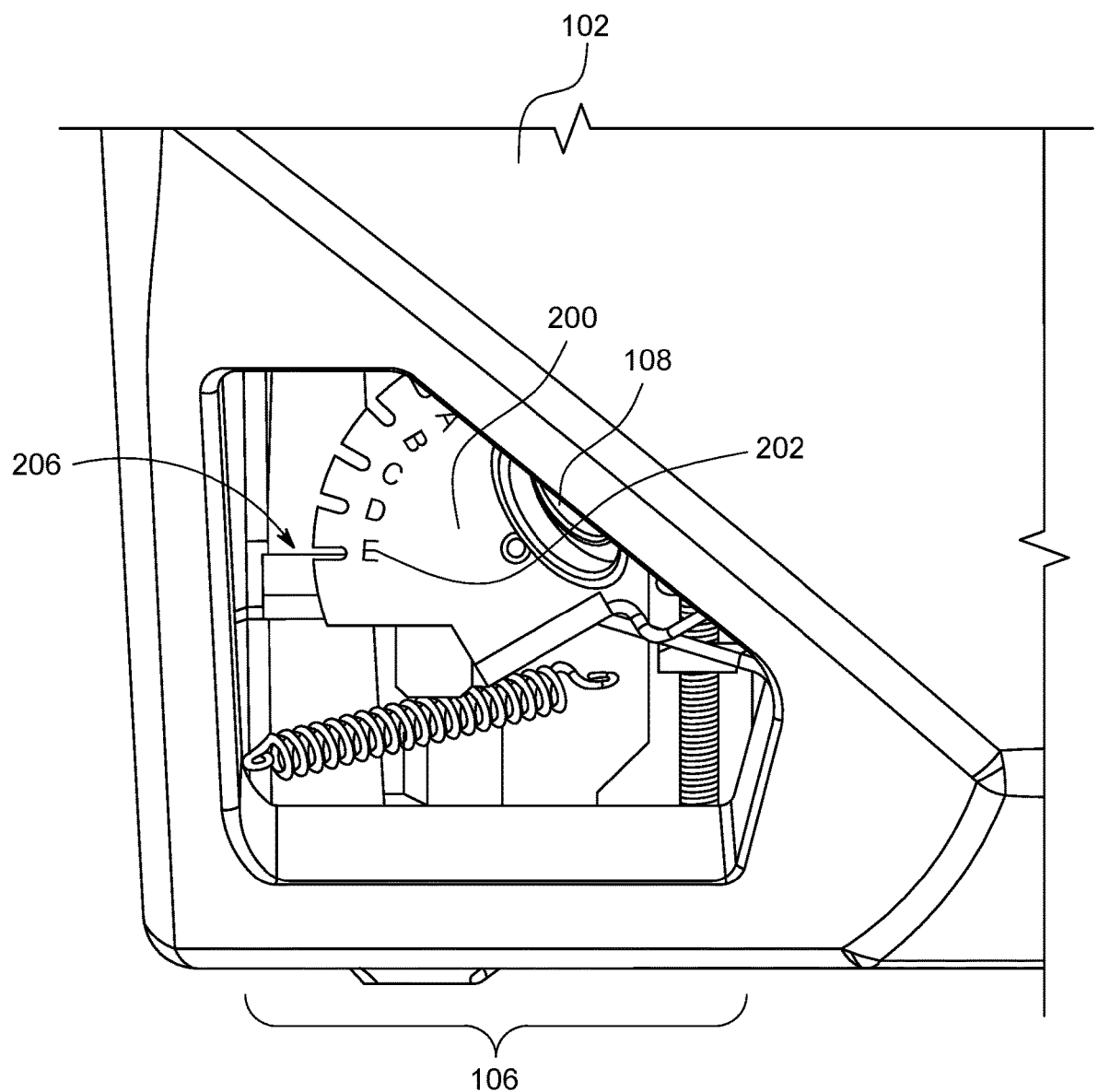
FIG. 11 illustrates the sensor movement apparatus shown in FIG. 4 in the second state or position according to one example.

FIGS. 9 through 11 illustrate the sensor movement apparatus 400 in a different state according to one example. In the example shown in FIGS. 9 through 11, the adjustment screw 406 has been actuated to cause the adjustment nut 504 to move downward along the adjustment screw 406 toward the bottom end 502 of the adjustment screw 406. As a result, the pivot plate 402 rotates about the pivot axis 416 in a clockwise direction to tilt the rear side of the sensor 108 downward within the housing 102 toward the bottom side 110 of the housing 102. This pivoting also causes the position of the orientation indication apparatus 200 to change relative to the indicator plate 206.

Rotation of the adjustment screw 406 in the clockwise direction causes the adjustment nut 504 to move downward along the adjustment screw 406 and cause the plate 402 to pivot downward. This pivoting motion of the plate 402 causes the indicator apparatus 200 to pivot upward relative to the indicator plate 206 and, as a result, move the D and E indicia 202 closer to or aligned with the indicator plate 206 and the A, B, and C indicia 202 to move farther from and above the indicator plate 206. As shown in FIG. 11, an operator outside of the housing 102 is able to view the new orientation of the sensor 108 as the E indicia 202 is now aligned with the indicator plate 206.

A method for indicating an orientation of a directional sensor (such as a camera) such that the indication of the orientation is externally viewable relative to a housing in which the sensor is disposed includes moving the sensor within the housing responsive to external actuation of a movement apparatus. For example, an adjustment screw may be rotated to change an orientation of the sensor within the housing. Alternatively, the orientation of the sensor may be remotely controlled, such as by using a remote control device and a motor that wirelessly communicates with the remote control device. In response to moving the sensor, an orientation indictor apparatus may visually represent the orientation of the sensor to an operator or other viewer that is external to the housing. For example, a body having indicia that represent different orientations of the sensor may move inside the housing and be visible through a window such that the orientation of the sensor may be determined from outside of the housing. As another example, an electronic display may present the orientation of the sensor.

One embodiment of the inventive subject matter described herein provides apparatuses and methods for adjusting the alignment of fixture mounted cameras. The adjustment may be an environmentally sealed adjustment that also provides a visual indicator to the manufacturing or installation personnel indicating the pointing position of the camera. Being able to adjust the pointing of a camera without first having to disassemble or open the housing can be a major cost savings when it comes to installing the camera unit in the field. Orienting a camera during commissioning of a camera system can take upward of an hour per unit or more, which represents a significant cost. This time is due mostly to having to open and partially disassemble the camera system once installed on the fixture. The inventive subject matter described herein allows for the installer to rapidly adjust the tilt of the camera to a selected position without having to open the housing of the camera system, thereby significantly reducing the time needed to orient the camera.

Additionally, many camera systems can be placed at the same position or orientation due to the wide similarity of installation situations. The orientation indicator apparatuses described herein allow for direct viewing of the final position of a camera by an assembler or by a field installer. The cameras for several systems can easily be set to the same orientation (e.g., position "B") without having to repeatedly adjust the cameras and check the images or videos obtained by the cameras.

During a field installation of a large number of camera systems, it can be difficult to pre-determine the final camera position prior to installation. An installer can commission a first camera system empirically, using the movement apparatus and orientation indicator apparatus, and observing the output video to select a position of the camera. Having once selected the position, the installer can then read the position from the indicator apparatus and set other camera systems to the same orientation, thereby saving a large amount of time. The final positions of the cameras can be noted in an installation database as another piece of information recorded during installation. If the sensor or camera system should have to be removed, it is possible to rapidly set the new sensor or camera systems to the positions of the previous systems, and thereby allowing the field commissioned values for target areas, exclusion zones, etc., to remain valid.

Unless defined otherwise, technical and scientific terms used herein have the same meaning as is commonly understood by one having ordinary skill in the art to which this disclosure belongs. The terms "first", "second", and the like, as used herein, do not denote any order, quantity, or importance, but rather are employed to distinguish one element from another. Also, the terms "a" and "an" do not denote a limitation of quantity, but rather denote the presence of at least one of the referenced items. The use of "including," "comprising" or "having" and variations thereof herein, are meant to encompass the items listed thereafter and equivalents thereof, as well as additional items. The terms "connected" and "coupled" are not restricted to physical or mechanical connections or couplings, and can include electrical and optical connections or couplings, whether direct or indirect.

Furthermore, the skilled artisan will recognize the interchangeability of various features from different embodiments. The various features described, as well as other known equivalents for each feature, can be mixed and matched by one of ordinary skill in this art, to construct additional systems and techniques in accordance with principles of this disclosure.

In describing alternate embodiments of the apparatus, specific terminology is employed for the sake of clarity. The invention, however, is not intended to be limited to the specific terminology so selected. Thus, it is to be understood that each specific element includes all technical equivalents that operate in a similar manner to accomplish similar functions.

It is noted that various non-limiting embodiments described herein, may be used separately, combined, or selectively combined for specific applications.

Further, some of the various features of the above non-limiting embodiments may be used to advantage, without the corresponding use of other described features. The foregoing description should therefore be considered as merely illustrative of the principles, teachings and exemplary embodiments of this invention, and not in limitation thereof.

The limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A system comprising:
    a light pole;
    a luminaire mounted to the light pole;
    a sensor system electromechanically coupled directly to or directly within the luminaire, the sensor system having a sealed housing;
    a light emitting apparatus disposed within the luminaire;
    a camera with environmentally sealed adjustment capabilities mounted within the sealed housing, the camera having a field of view that is at least partially illuminated by light from the light emitting apparatus;
    a movement apparatus coupled to the camera and arranged to change an orientation of the camera based on operator actuation of the movement apparatus from outside of the sealed housing, the change of the orientation of the camera causing a field of view of the camera to change; and
    an indicator apparatus that presents an orientation of the camera to a viewer that is outside of the housing, without opening the housing, by moving the indicator apparatus as the orientation of the camera is changed, wherein the indicator apparatus is interconnected with the camera, and changing the orientation of the camera also changes a position of the indicator apparatus within the housing.

2. The system of claim 1, further comprising: a window in the sealed housing that provides visibility through which an orientation of the camera is viewable to an operator outside of the sealed housing.

3. The system of claim 1, wherein the indicator apparatus includes a sensor that detects movement or an orientation of the camera and visually displays the orientation of the camera on a display.

4. The system of claim 1, further comprising a remote control device and a motor that wirelessly communicates with the remote control device, wherein orientation of the camera s is remotely controllable using the remote control device.

5. The system of claim 1, wherein the movement apparatus includes a plate coupled with the camera and that pivots within the housing and moves both the camera and the indicator apparatus.

6. The system of claim 5, wherein the movement apparatus includes: an adjustment screw that is positioned to be rotated from outside of the housing, and an adjustment nut coupled with the adjustment screw that moves along a length of the adjustment screw responsive to rotation of the adjustment screw, which causes the adjustment nut to move the pivot plate relative to the adjustment screw.

7. A sensor method comprising:
    accessing a luminaire that is mounted to a light pole, the luminaire including a sensor system electromechanically coupled directly to or directly within the luminaire, the sensor system having a sealed housing, and a light emitting apparatus within the sealed housing;
    mounting a camera with environmentally sealed adjustment capabilities within the sealed housing, the camera having a field of view that is least partially illuminable by light from the light emitted apparatus;
    coupling a movement apparatus to the camera that is arranged to change an orientation of the camera disposed inside the sealed housing; and causing a change in a field of view of the camera by changing an orientation of the camera, via the movement apparatus, based on operator actuation of the movement apparatus from outside of the sealed housing;
    providing visibility through a window by which an orientation of the camera is viewable to an operator outside of the housing;
    coupling an indicator apparatus to the camera; and
    enabling a change in an orientation of the camera to change a position of the indicator apparatus within the housing.

8. The method of claim 7, further comprising:
    presenting an orientation of the camera to a viewer that is outside of the housing using an indicator apparatus, without opening the housing, by moving the indicator apparatus as the orientation of the camera is changed.

9. The method of claim 7, further comprising:
    wirelessly communicating with the camera using a remote control device; and changing an orientation of the camera via the wireless communication from the remote control device and a motor.

10. The method of claim 7, further comprising: pivoting the movement apparatus within the housing to move both the camera and the indicator apparatus.

11. The method of claim 10, wherein the movement apparatus includes an adjustment screw and an adjustment nut, the method further comprising:
   positioning the adjustment screw to be rotated from outside of the housing;
   coupling the adjustment nut to the adjustment screw; and
   moving the adjustment nut along a length of the adjustment screw responsive to rotation of the adjustment screw, which causes the adjustment nut to move the pivot plate relative to the adjustment screw.

12. A system comprising:
   a mountable luminaire, the mountable luminaire having a sealed housing;
   a sensor system electromechanically coupled directly to or directly within the luminaire, the sensor system having a sealed housing;
   a light emitting apparatus disposed within the luminaire;
   a camera with environmentally sealed adjustment capabilities mounted within the sealed housing, the camera having a field of view that is at least partially illuminated by light from the light emitting apparatus;
   a movement apparatus coupled to the camera and arranged to change an orientation of the camera based on operator actuation of the movement apparatus from outside of the sealed housing, the change of the orientation of the camera causing a field of view of the camera to change;
   an indicator apparatus that presents an orientation of the camera to a viewer that is outside of the housing, without opening the housing, by moving the indicator apparatus as the orientation of the camera is changed; and
   a remote control device that wirelessly communicates with the remote control device, wherein the orientation of the camera is remotely controllable using the remote control device.

13. The system of claim 12, further comprising: a window in the sealed housing that provides visibility out of an interior of the sealed housing to a location outside of the sealed housing, wherein the window in the sealed housing provides visibility through which an orientation of the camera is viewable to an operator outside of the housing.

14. The system of claim 12, further comprising a remote control device that wirelessly communicates with the remote control device, wherein the orientation of the camera is remotely controllable using the remote control device.

* * * * *